United States Patent
De Haan et al.

(10) Patent No.: US 8,630,507 B2
(45) Date of Patent: Jan. 14, 2014

(54) IMAGE DATA PROCESSING AND ARRANGEMENTS THEREFOR

(75) Inventors: Gerard De Haan, Mierlo (NL); Hao Hu, Eindhoven (NL)

(73) Assignee: Entropic Communications Inc., San Diego, CA (US)

( * ) Notice: Subject to any disclaimer, the term of this patent is extended or adjusted under 35 U.S.C. 154(b) by 708 days.

(21) Appl. No.: 12/678,285

(22) PCT Filed: Sep. 12, 2008

(86) PCT No.: PCT/IB2008/053703
§ 371 (c)(1),
(2), (4) Date: Jul. 7, 2010

(87) PCT Pub. No.: WO2009/034555
PCT Pub. Date: Mar. 19, 2009

(65) Prior Publication Data
US 2010/0310156 A1    Dec. 9, 2010

Related U.S. Application Data

(60) Provisional application No. 60/972,718, filed on Sep. 14, 2007.

(51) Int. Cl.
*G06K 9/40* (2006.01)
(52) U.S. Cl.
USPC ............ 382/275; 382/261; 382/264; 358/463
(58) Field of Classification Search
USPC .......................... 382/275, 260–265; 358/463
See application file for complete search history.

(56) References Cited

U.S. PATENT DOCUMENTS

| | | | |
|---|---|---|---|
| 6,192,161 | B1 | 2/2001 | Kondo et al. |
| 2002/0186309 | A1 | 12/2002 | Keshet et al. |
| 2004/0091168 | A1 | 5/2004 | Jones et al. |
| 2006/0227382 | A1 | 10/2006 | Ng et al. |
| 2007/0009167 | A1 | 1/2007 | Dance et al. |

OTHER PUBLICATIONS

Zhao et al, Content Adaptive Image De-blocking, IEEE 2004.*
Kondo et al, New ADRC for Consumer Digital VCR, IEEE 1990.*
Philippe Monet at al, Block Adaptive Quantization of Images, IEEE 1993.*
H. Hu et al., "Classification-based Hybrid Filters for Image Processing", Proceedings of SPIE, SPIE, Bellingham, VA, US, Jan. 18, 2006, pp. 60711/1-607711/10, vol. 6077, , XP009115683, ISSN: 0277-786X.
H. Hu et al., "Simultaneous Coding Artifact Reduction and Sharpness Enhancement", IEEE International Conference on Consumer Electronics, Digest of Tehinical Papers, Jan. 1, 2007, pp. 1-2, XP031071493, ISBN: 978-1-4244-0762-0.

(Continued)

*Primary Examiner* — Chan S Park
*Assistant Examiner* — Mark Roz
(74) *Attorney, Agent, or Firm* — Bruce Greenhaus; Richard Bachand; Duane Morris LLP

(57) ABSTRACT

Image data processing is facilitated. According to an example embodiment, image data is processed using photometric similarity and, where appropriate, a classification of sample pixels for the image data. In some applications, a trained bilateral filter function is used with a filter coefficient selected for a particular classification of image data to filter artifacts in the image data.

17 Claims, 3 Drawing Sheets

(56) References Cited

OTHER PUBLICATIONS

Aria Nosratinia, "Enhancement of JPEG-compressed Images by Re-application of JPEG", Department of Electrical Engineering, University of Texas at Dallas, 2002, Kluwer Academic Publishers, Netherlands.

C. Tomasi, et al., "Bilateral Filtering for Gray and Color Images", 6th International Conference on Computer Vision, ICCV '98, Jan. 4-7, 1998, pp. 839-846, XP00926378, ISBN: 978-078803-5098-4, Bombay, India.

Shuai Wan et al., Perceptually adaptive Joint Deringing—Deblocking Filtering for Scalable Video Coding, 2nd International Mobile Multimedia Communications Conference, Sep. 2006, Alghero, Sardinia, Italy.

Olukayode A. Oho et al., "An Algorithm for Integrated Noise Reduction and Sharpness Enhancement", IEEE Transactions on Consumer Electronics, Aug. 2000, pp. 474-480, vol. 46, No. 3, XP001142869, ISSN: 0098-3063.

Elizabeth A. Thompson et al., "Hybrid order statistic filter and its application to image restoration", Applied Optics, Optical Society of America, Feb. 10, 2001, pp. 656-661, vol. 40, No. 5, XP009115731, ISSN: 0003-6935.

H. Hu et al., "Trained bilateral Filters and Applications to Coding Artifacts Reduction", Eindhoven University of Technology, the Netherlands; Philips Research Laboratories, the Netherlands, 2007.

International Search Report for PCT/IB2008/053703 mailed May 11, 2009.

* cited by examiner

IMAGE DATA PROCESSING AND ARRANGEMENTS THEREFOR

CROSS REFERENCE TO RELATED APPLICATIONS

This application is a continuation of International Application No. PCT/IB2008/053703, filed Sep. 12, 2008, which claims the benefit of U.S. Provisional Application No. 60/972,718, filed Sep. 14, 2007, both of which are incorporated in their entireties herein by reference.

The present invention relates generally to image applications and, more particularly, to processing pixel data.

Bilateral filtering is a simple and non-linear technique to remove image noise while preserving edges. Generally, as a non-iterative and simple filtering technique, bilateral filtering has received considerable attention in areas such as image processing and computer vision. Unlike the conventional linear filters of which the coefficients are pre-determined, a bilateral filter adjusts its coefficients to the geometric closeness and photometric similarity of the pixels. Due to this ability to adapt, it has shown good performance at edge-preserving smoothing for image restoration applications, such as noise reduction and digital coding artifacts reduction.

However, it has been difficult to optimize a bilateral filter to obtain desired effect by supervised training or otherwise. Previous approaches to bilateral filtering have used a Gaussian function to relate coefficients to the geometric closeness and photometric similarity of the pixels. However, this approach is somewhat arbitrary and can be inadequate for various applications. Moreover, while coefficients used for linear filters can be adjusted to achieve desirable effects, such adjustment has been challenging.

These and other limitations present challenges to image creation and related applications.

The present invention is directed to overcoming the above-mentioned challenges and others, as may be related to applications including those discussed above. These and other aspects of the present invention are exemplified in a number of illustrated implementations and applications, some of which are shown in the figures and characterized in the claims.

Various embodiments of the present invention are directed to image data processing to reduce or eliminate undesirable image characteristics, using a transformation or filter function together with information about the image data.

According to an example embodiment, pixel data is generated for a target pixel of an image. Sample pixel data, from a set of sample pixels for the image, is transformed as a function of photometric similarity of the sample pixels. The transformed sample pixel data is used to generate and output pixel data for the target pixel.

In some applications, the sample pixel data is transformed using a trained bilateral filter with filter coefficients determined for a classification of image data under which the sample pixel data falls. The filter coefficients are determined using an original image and a corrupted version of the original image. The corrupted version is processed with the original image to determine a desirable coefficient for a particular class of image data under which the original and corrupted images fall. Desirable coefficients are determined for different types or classifications of image data and used in subsequent transformation (e.g., filtering) of different image data.

In another example embodiment of the present invention, artifacts in image data are filtered. Coding artifacts and image edges in image data are classified and a predetermined filter coefficient is selected in response to the classification. The image data is processed with a bilateral filter function that uses the predetermined filter coefficient to generate output image data.

The above summary is not intended to describe each illustrated embodiment or every implementation of the present invention. The figures and detailed description that follow more particularly exemplify these embodiments.

The invention may be more completely understood in consideration of the following detailed description of various embodiments of the invention in connection with the accompanying drawings, in which.

Figure 1:
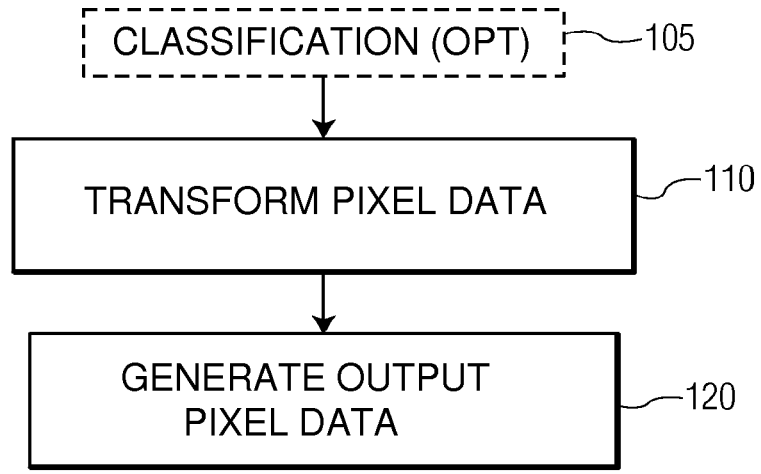
FIG. 1 shows a flow diagram for an approach to image processing, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is believed to be applicable to a variety of imaging and image processing approaches. While the present invention is not necessarily limited to such applications, an appreciation of various aspects of the invention is best gained through a discussion of examples in such an environment.

In connection with various example embodiments of the present invention, an image filtering or transformation function is used to process image data to reduce or remove undesirable characteristics in the image data. In some applications, the image filtering function exhibits characteristics of a bilateral filter with offline optimization (training) such as Least Mean Square optimization, and is thus referred to as a trained bilateral filter. In this context, the term optimize generally refers to an approach involving the selection of desirable image processing (e.g., filtering) characteristics and may not necessarily involve any determination of best or optimum characteristics. The bilateral filter function is implemented with a variety of different types of image data, such as JPEG and MPEG4 image data, and used with H.264/MEPG4 AVC deblocking for image processing approaches that involve artifact reduction (or mitigation) and the preservation of image edges.

According to another example embodiment, a trained bilateral filter uses a linear combination of spatially ordered and rank ordered pixel samples (i.e., pixel data). The rank-ordered pixel samples are transformed to reflect photometric similarity of the pixels. Consequently, the trained bilateral filter possesses characteristics of an original bilateral filter while facilitating filter coefficient optimization. In some applications, coefficients for the combined pixel samples can be obtained by Least Mean Square optimization as the linear filters.

Various embodiments are directed to the use of a trained bilateral filter to reduce coding artifacts for image data created using JPEG and/or H.264/MEPG4-AVC standards. In these applications, local image structure information is utilized for classifying coding artifacts and true image edges. For instance, where a particular pixel or set of pixels is filtered, local image structure refers to adjacent pixels. A trained bilateral filter, trained or optimized for classes of image data (e.g., data that is classed according to a likelihood of the data including artifact-type characteristics), is used to reduce or remove coding artifacts and preserve true image edges. Desirable filter coefficients are obtained by training the filters on original images and their compressed versions, effectively via processing of image data from the compressed versions with different filter coefficients to identify coefficients that produce desirable results.

Turning now to the figures, FIG. 1 shows a flow diagram for an approach to generating pixel data for a target pixel of an image, according to another example embodiment of the present invention. At block 110, sample pixel data is transformed from a set or aperture of sample pixels for the image as a function of photometric similarity of the sample pixels. This transformation (processing) may involve, for example, filtering artifacts from the pixel data using a filter function with filtering coefficients that correspond with a type or class of the pixel data as optionally classified, for example as shown at block 105 before (or during) the transformation at block 110. At block 120, the transformed sample pixel data is used to generate and output pixel data for the target pixel. These steps may be repeated across a multitude of pixels for an image to generate output pixel data that can be used to reconstruct a corrected or filtered version of the image.

In some embodiments, the transformation at block 110 includes using a membership function to transform sample pixel data for each pixel in the sample pixels. At block 120, the transformed sample pixel data is used to generate pixel data as follows. A vector with the transformed sample pixel data is generated and concatenating with a vector including the sample pixel data (i.e., prior to transformation) arranged by spatial order. The concatenated vectors are weighted to generate pixel data for the target pixel.

Figure 2:
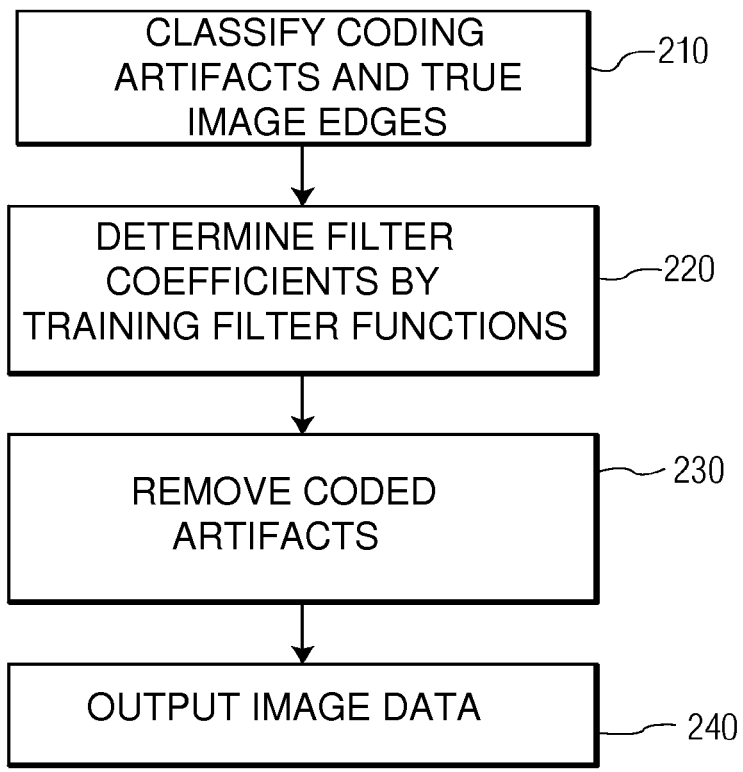
FIG. 2 shows a flow diagram for an approach to image processing, according to another example embodiment of the present invention.

FIG. 2 shows another flow diagram for processing JPEG or MPEG-type image data, according to another example embodiment of the present invention. At block 210, local image structure data is used to classify coding artifacts and true image edges for pixel data to be corrected. At block 220, filter coefficients are determined by training filter functions on original images and compressed versions of the original images. This training approach generally involves processing image data that has been compressed (and, correspondingly, exhibits artifacts) with different filters or filtering coefficients and comparing the results with an original image to determine a desirable filter function or filter coefficient for a set filter function. Further, this training approach may involve determining different filter coefficients for different classes of image data (i.e., classed relative to characteristics of the image data), and in turn using filters with a particular set of image data according to the characteristics and classification of the set of image data. In these contexts, it should be noted that, for various embodiments, the steps at block 220 are performed prior to classifying local image structure data at block 210.

At block 230, a bilateral filter trained with the determined filter coefficients is used to remove coding artifacts from the image data. This removal is generally achieved while preserving true edges; that is, edges that are part of an image are preserved, relative to artifact-based edges. The filtered image data is then output at block 240 for use in a variety of applications.

A variety of filter functions (e.g., software-implemented functions) are used to process image data in accordance with different example embodiments of the present invention. The following describes an example approach to filter-based processing of image data. Using $X=(x_1, x_2, \ldots, x_N)^T$ as a vector containing n pixels arranged by the spatial order within a filter aperture, the output $y_b$ of a bilateral filter is defined by:

$$y_b = \frac{\sum_{i=1}^{N} x_i \cdot c(x_i, x_c) \cdot s(x_i, x_c)}{\sum_{i=1}^{N} c(x_i, x_c) \cdot s(x_i, x_c)} \quad (1)$$

$$s(x_i, x_c) = \exp[-(x_c - x_i)^2 / 2\sigma_s^2]$$

$$c(x_i, x_c) = \exp[-d(x_c, x_i)^2 / 2\sigma_c^2]$$

$$i = 1, 2, \ldots, N.$$

where $d(x_c, x_i)$ is the Euclidean distance between the pixel position of $x_i$ and $x_c$.

The output $y_l$ of a linear filter is:

$$y_l = W^T X. \quad (2)$$

where W is an N×1 vector of weights. Consequently, the linear filter considers the geometric closeness of the pixel samples.

To include the rank order information, samples in the vector X are ordered according to their rankings and the vector $X_r=(x_{(1)}, x_{(2)}, \ldots, x_{(N)})^T$ is obtained. The concatenation of X and Xr gives a vector $X_h$, and the output of the hybrid filter $y_h$ is:

$$y_h = W_h^T X_h. \quad (3)$$

where $W_h$ is an 2N×1 vector of weights.

Similarity information is incorporated using the vector $X_s=(x_{[1]}, x_{[2]}, \ldots, X_{[N]})^T$ by sorting the pixels according to their pixel value distance to a spatially central pixel $x_c$ in an aperture (e.g., in a group of sample pixels used in generating pixel data for a central output pixel). The ordering is defined by:

$$|x_{[i+1]} - x_c| \geq |x_{[i]} - x_c|, i=1, 2, \ldots, N. \quad (4)$$

The vector $X_s$ is transformed into $X_{s'}=(x_{[1]'}, x_{[2]'}, \ldots, x_{[N]'})^T$. The transform is defined as:

$$x_{[i]'} = \mu(x_c, x_{[i]}) \cdot x_c + (1 - \mu(x_c, x_{[i]})) \cdot x_{[i]}, i=1, 2, \ldots, N. \quad (5)$$

where $\mu(x_c, x_{[i]})$ is a membership function between $x_{[i]}$ and $x_c$. The membership function is defined as:

$$\mu(x_c, x_{[i]}) = \mathrm{MIN}\left(\frac{|x_{[i]} - x_c|}{K}, 1\right). \quad (6)$$

where K is a pre-set constant. Other membership functions such as a Gaussian function are implemented for various embodiments. The vector $X_{tb}$ is obtained by concatenating the vectors X and $X_{s'}$:

$$X_{tb}=(x_1, x_2, \ldots, x_n, x_{[1]'}, x_{[2]'}, \ldots, x_{[N]'})^T. \quad (7)$$

Similar to the linear filter, the output of the proposed trained bilateral filter is:

$$y_{tb} = W_h^T X^{tb}. \quad (8)$$

where $W_{tb}$ is an 2N×1 vector of weights. Using this trained bilateral filter approach, in the presence of true image structures, the weights of the transformed samples that are similar to the center sample value are increased to better preserve edges, yet the weight of a linear part of the output can be adjusted accordingly (e.g., when low-pass filtering is needed to suppress the blocking artifacts). In some regards, the trained bilateral filter function processes data in accordance with an original bilateral filter function with coefficients that are continuously dependent on the spatial and intensity difference of pixels being processed.

An optimization (or desirable processing parameters) of the trained bilateral filter can be accomplished in a similar fashion as for a linear filter. For instance, the output of the trained bilateral filter $y_{tb}(t)=W^T_{tb}X_{tb}(t)$ is used to estimate the desired signal d(t). Desirable or optimal filter coefficients are obtained when the mean square error between the output and desired signal is reduced or minimized. The mean square error MSE is:

$$MSE=E[(y_{tb}(t)-d(t))^2]=E[(W_{tb}^T X_{tb}(t)-d(t))^2]. \quad (9)$$

Taking the first derivative with respect to the weights and setting it to zero gives:

$$W_{tb}^T=E[X_{tb}X_{tb}^T]^{-1}E[X_{tb}d]. \quad (10)$$

Figure 3:
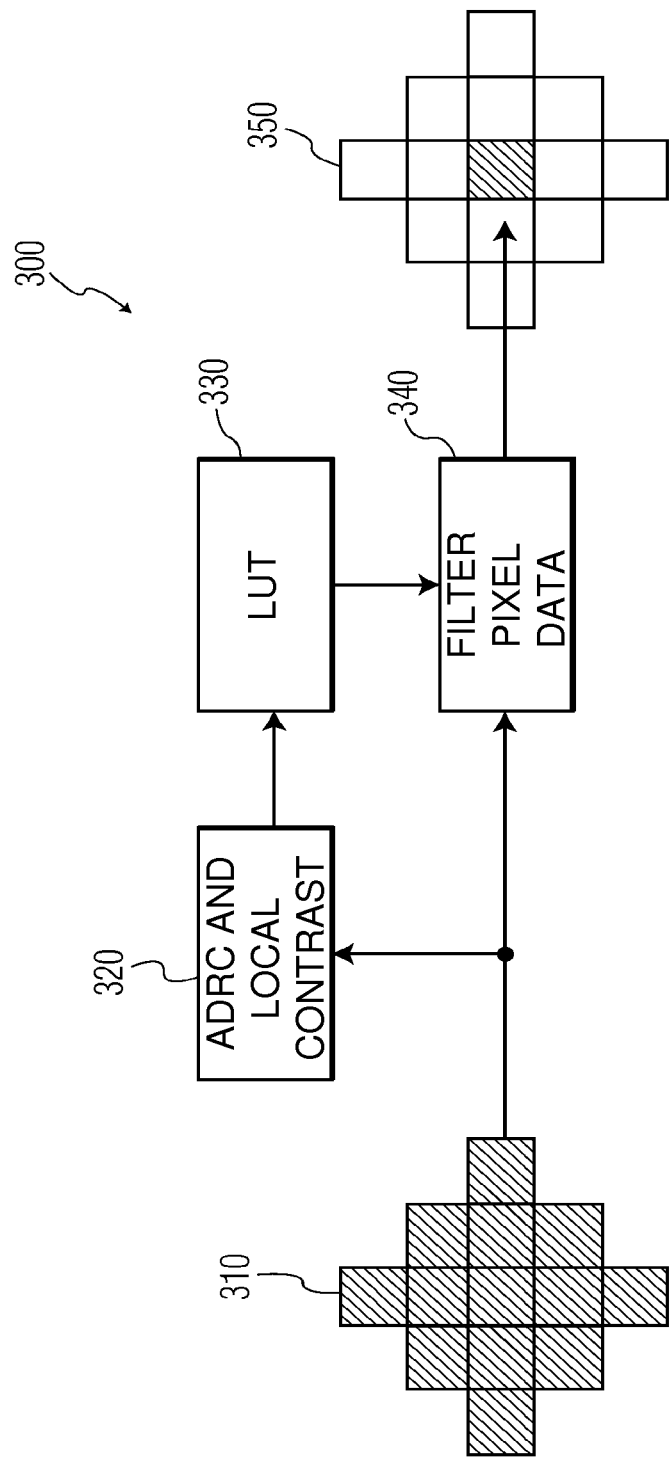
FIG. 3 shows a block diagram for an image for an image filtering approach, according to another example embodiment of the present invention.

FIG. 3 shows a system 300 and approach to filtering image data to reduce or eliminate coding artifacts, according to another example embodiment of the present invention. Local image structure information is used to classify coding artifacts and true image edges. A diamond shaped filter aperture 310 is centered at an output pixel or target pixel, with data from surrounding pixels used to filter or process the pixel data to generate an output pixel 350. The local image structure within the filter aperture is first classified by Adaptive Dynamic Range Coding (ADRC) and local contrast information at block 320. At block 330, a look-up table (LUT) is used to look up filter coefficients to be used in trained bilateral filtering of pixel data for the aperture 310. Using the filter coefficients, the pixel data is processed or filtered at block 340 to calculate the output pixel 350. This approach can be repeated, sliding the filter aperture pixel by pixel over an entire image.

Local structure for a particular pixel being processed is classified using one or more of a variety of approaches, with the classification used to select a filter coefficient for filtering the pixel data. A 1-bit ADRC code of every pixel is defined by:

$$ADRC(x_i) = \begin{cases} 0, & \text{if } x_i < \frac{x_{max} + x_{min}}{2} \\ 1, & \text{otherwise} \end{cases} \quad (11)$$

where $x_i$ is the value of pixels in the filter aperture and $x_{max}$, $x_{min}$ are the maximum and minimum pixel values in the filter aperture. An extra bit, DR, which includes contrast information in the aperture is added to the ADRC code. The extra bit is defined as:

$$DR = \begin{cases} 0, & \text{if } x_{max} - x_{min} < Tr \\ 1, & \text{otherwise} \end{cases} \quad (12)$$

where Tr is the pre-set threshold value related to the coding quantization. The concatenation of $ADRC(x_i)$ of all pixels in the filter aperture and the extra bit DR gives the class code, used to address the coefficient look-up table. The number of classes given by ADRC code can be reduced by bit inversion to $2^{N-1}$. Together with the extra bit DR, the number of classes becomes $2^N$.

Figure 4:
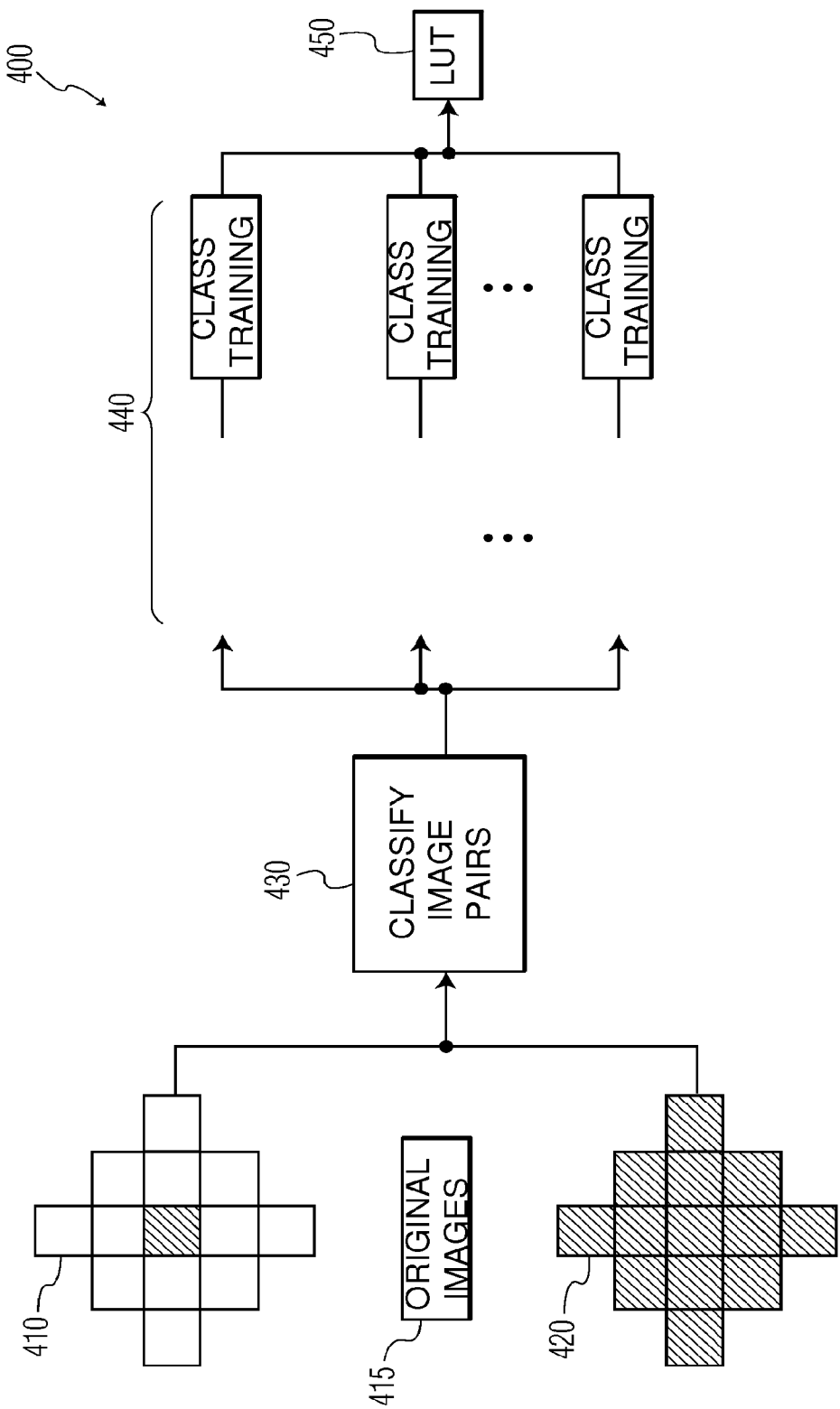
FIG. 4 shows a block diagram for a training procedure for an image processing approach, according to another example embodiment of the present invention.

As discussed above, a variety of approaches may be used to set (or train) filtering function characteristics for certain applications, using coefficients (or other approaches) to suit filters to particular classes of image data. FIG. 4 shows an approach to training a filter function, according to another example embodiment. Original images (410) are used as a reference output image for a training set, and are compressed at 415 with an expected compression ratio to generate simulated (corrupt) input images (420). The simulated input and the reference output image pairs are collected pixel-by-pixel from the training material and are classified at 430 on the input (e.g., based upon the presence of edges in the data or otherwise, as discussed above). At 440, image pairs that belong to one specific class are used for the corresponding training, resulting in desirable (or optimal) coefficients for each particular class. These coefficients are stored in a look-up-table (LUT) 450, where they are available for use in processing data for a multitude of pixels.

Various embodiments of the present invention are applicable to use in connection with one or more approaches for image data processing as described in the following references, each of which is fully incorporated herein by reference:

[1] C. Tomasi and R. Manduchi, "Bilateral Filtering for Gray and Color Images", *Proceedings of the* 1998 *IEEE International Conference on Computer Vision*, Bombay, India.

[2] S. Wan, M. Mrak and E. Izquierdo, "Perceptually Adaptive Joint Deringing Deblocking Filtering for Scalable Video Coding", 2*nd International Mobile Multimedia Communications Conference*, Alghero, Sardinia, Italy, September 2006.

[3] H. Hu and G. de Haan, "Classification-based hybrid filters for image processing", *Proceedings of SPIE, Visual Communications and Image Processing*, San Jose, USA, January 2006.

[4] H. Hu and G. de Haan, "Simultaneous coding artifacts reduction and sharpness enhancement", *IEEE International Conference on Consumer Electronics*, Las Vegas, USA, January 2007.

[5] ITU-T Recommendation and International Standard of Joint Video Specification (ITU-T Rec. H.264/ISO/IEC 14 496-10: 2005), December 2005.

[6] T. Kondo, Y. Fujimori, S. Ghosal and J. J. Carrig, "Method and apparatus for adaptive filter tap selection according to a class", U.S. Pat. No. 6,192,161 B1, Feb. 20, 2001.

[7] A. Nosratinia, "Denoising of JPEG images by re-application of JPEG," *Journal of VLSI Signal Processing*, vol. 27, no. 1, pp. 6979, 2001.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, different filtering parameters or coefficients may be used to filter image data, or different image data may be filtered using a similar approach (e.g., other aspects of JPEG, MPEG or related standards as implemented now or may be developed would be applicable for use in connection with various embodiments). Different membership functions may be used as well, including those suggested in the text above (e.g., a Gaussian function) as well as others. Such modifications and changes do not depart from the true spirit and scope of the present invention, including that set forth in the claims that follow.

What is claimed is:

1. A method for generating pixel data for a target pixel of an image, comprising:
   transforming sample pixel data from a set of sample pixels for the image as a function of a classification of the pixels and photometric similarity of the pixels using a membership function to transform sample pixel data for each pixel in the sample pixels; and
   using the transformed sample pixel data to generate and output pixel data for the target pixel, by:
   generating a vector with the transformed sample pixel data,
   concatenating the generated vector with a vector including the sample pixel data arranged by spatial order, and
   weighting the concatenated vectors to generate pixel data for the target pixel.

2. The method of claim 1, wherein
   said classification is based upon a local image structure of the sample pixels, with different pixels in the image having different classifications, and
   the step of transforming includes transforming the sample pixel data with a filter function that uses a filter coefficient that is predetermined for the classification.

3. The method of claim 1, further including classifying the sample pixels using local image structure of the sample pixels, wherein the steps of classifying, transforming and using are performed for a multitude of target pixels in the image.

4. The method of claim 1, further including
   training a bilateral filter function by processing original input data to generate simulated input data, and using the simulated input data and the original input data to generate a filter coefficient for a class of pixel data under which the input data is classified, and
   determining said classification of the pixels by classifying the sample pixel data according to local image structure in the sample pixel data,
   wherein the step of transforming includes using the trained bilateral filter function with a filter coefficient for the classification of the sample pixel data to transform the sample pixel data.

5. The method of claim 1, further including determining said classification of the pixels by classifying the sample pixels according to local image structure of the pixel data.

6. The method of claim 1, wherein the step of transforming includes transforming the sample pixel data with a filter function that uses a filter coefficient that is determined using a minimization of a mean square error between an output of the filter function and a desired output.

7. The method of claim 1, further including determining said classification of the pixels by classifying the sample pixel data using contrast information in the sample pixel data to detect artifacts.

8. The method of claim 1, further including
   determining minimum and maximum pixel values for the sample pixels, and
   selecting a filter coefficient as a function of a difference between the minimum and maximum pixel values,
   wherein the step of transforming includes transforming the sample pixel data with a filter function that uses the selected filter coefficient.

9. The method of claim 1,
   further including deriving a filter function coefficient for a pixel classification using a Least Mean Square optimization of a signal output from a filter function,
   wherein the step of transforming includes transforming sample pixel data having the pixel classification with a filter function that uses the derived filter coefficient.

10. A method for generating pixel data for target pixels of an image, comprising, for each target pixel:
    transforming sample pixel data from a set of sample pixels for the image as a function of photometric similarity of the pixels and transformation coefficients specific to the target pixels relative to other pixels in the image using a membership function to transform sample pixel data for each pixel in the sample pixels; and
    using the transformed sample pixel data to generate and output pixel data for the target pixel by:
    generating a vector with the transformed sample pixel data,
    concatenating the generated vector with a vector including the sample pixel data arranged by spatial order, and
    weighting the concatenated vectors to generate pixel data for the target pixel.

11. The method of claim 10, wherein the step of transforming includes bilaterally filtering sample pixel data using a bilateral filtering function having coefficients defined as a function of spatial and intensity differences between the sample pixels and the target pixel.

12. A computer-implemented system for generating pixel data for a target pixel of an image, the system comprising a non-transitory computer-readable medium comprising instructions, which, when implemented by a processor:
    transform sample pixel data from a set of sample pixels for the image as a function of a classification of the pixels and photometric similarity of the sample pixels using a membership function to transform sample pixel data for each pixel in the sample pixels; and
    generate pixel data using the transformed sample pixel data to generate and output pixel data for the target pixel by:
    generating a vector with the transformed sample pixel data,
    concatenating the generated vector with a vector including the sample pixel data arranged by spatial order, and
    weighting the concatenated vectors to generate pixel data for the target pixel.

13. The system of claim 12, wherein the instructions transform the sample pixel data using a predetermined filter function defined for classifying the pixels.

14. The system of claim 12, wherein
    said classification of the pixels is based upon a local image structure of the pixels, and
    the instructions transform the sample pixel data with a filter function that uses a filter coefficient that is predetermined for the classification.

15. The system of claim 12, wherein the instructions classify the sample pixel data according to local image structure of the pixel data to determine said classification of the pixels, and transforms the sample pixel data with a filter function that uses a filter coefficient that is predetermined for the classification.

16. The system of claim 12, wherein the instructions transform the sample pixel data with a filter function that uses a filter coefficient that is determined using a minimization of a mean square error between an output of the filter function and a desired output.

17. The system of claim 12, wherein the instructions classify the sample pixel data using contrast information in the sample pixel data to detect artifacts, thereby determining said classification of the pixels, and transforms the sample pixel data with a filter function that uses a filter coefficient for the classification.

* * * * *